April 25, 1950

J. V. BERTRAND 2,505,602

DIELECTRIC HEATING FOR INJECTION
MOLDING MACHINES AND THE LIKE

Filed Sept. 20, 1946

INVENTOR
JOSEPH V. BERTRAND
BY
Hammond & Littell
ATTORNEYS

April 25, 1950  J. V. BERTRAND  2,505,602
DIELECTRIC HEATING FOR INJECTION
MOLDING MACHINES AND THE LIKE
Filed Sept. 20, 1946  3 Sheets-Sheet 2
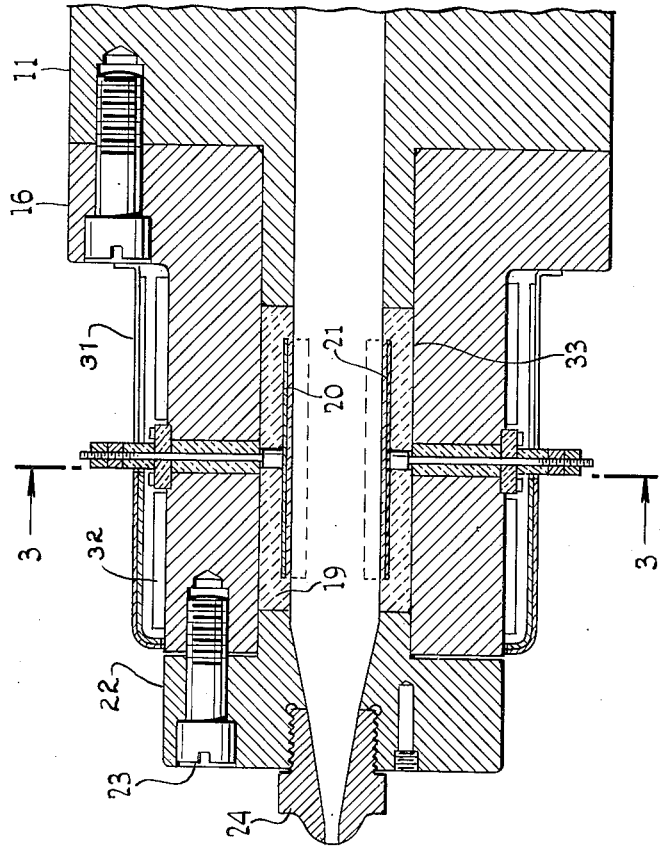
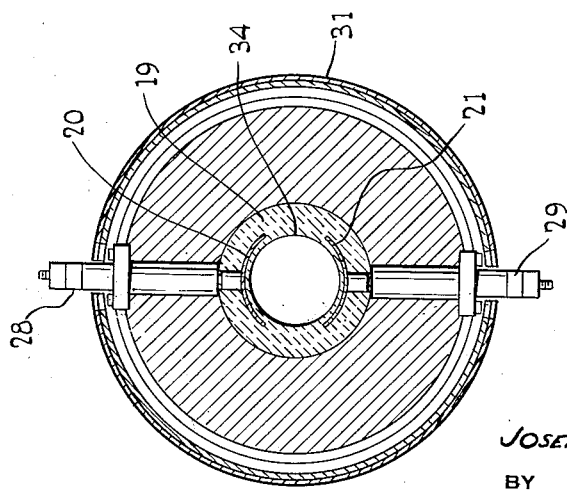
INVENTOR
JOSEPH V. BERTRAND
BY
Hammond & Littell
ATTORNEYS April 25, 1950 J. V. BERTRAND 2,505,602
DIELECTRIC HEATING FOR INJECTION
MOLDING MACHINES AND THE LIKE
Filed Sept. 20, 1946 3 Sheets-Sheet 3
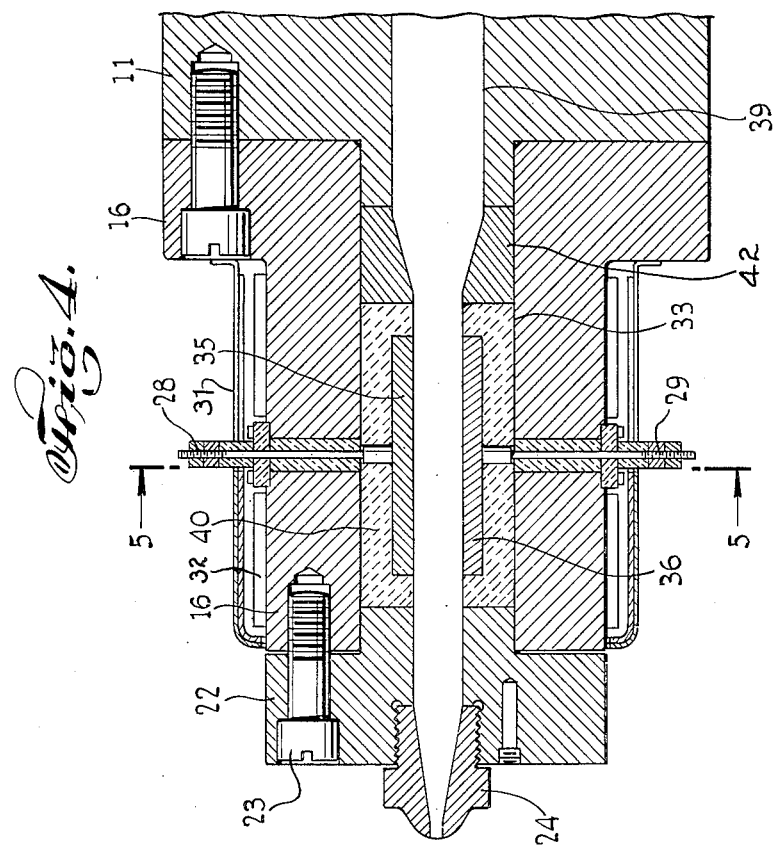
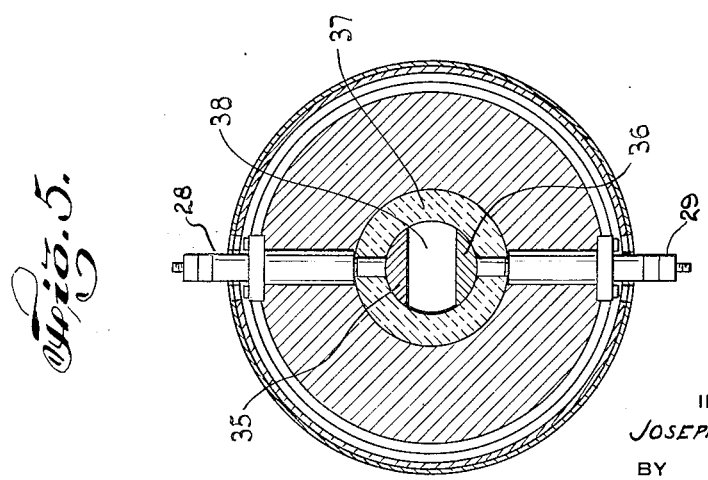
INVENTOR
JOSEPH V. BERTRAND
BY
Hammond + Littell
ATTORNEYS Patented Apr. 25, 1950

2,505,602

UNITED STATES PATENT OFFICE 2,505,602

DIELECTRIC HEATING FOR INJECTION MOLDING MACHINES AND THE LIKE

Joseph V. Bertrand, Brooklyn, N. Y., assignor to Hydropress, Incorporated, New York, N. Y., a corporation of Delaware Application September 20, 1946, Serial No. 698,243

6 Claims. (Cl. 219—47)

This invention relates to plastic injection molding machines and particularly to a machine wherein the plastic material to be molded is heated dielectrically or electrostatically.

Dielectric or electrostatic heating is especially advantageous in the heating of plastics because of the poor heat conducting properties of the plastic. By using dielectric heating, heat will be generated in the plastic substantially uniformly throughout the mass thereof whereas with conduction heating, the heat must travel through the mass which will take considerable time especially in the case of large masses of plastic.

One of the objects of the present invention is to provide an injection molding machine heating and pressure cylinder or chamber especially adapted for use in dielectrically heating the thermoplastic or thermosetting material to be molded. The electrodes must be insulated from the rest of the machine. Considerable pressure is used during the injection step so that excessive wear may occur on the surface of ordinary metal electrodes due to the abrasive action of the plastic granules. Also by using a ceramic or equivalent material having high abrasion resistance excessive wear on the cylinder surfaces will be eliminated. The difficulty with such materials is that ceramic and similar materials usually do not have a sufficiently high circumferential tensile strength to withstand the high pressures used in injection molding.

Another of the objects of the invention is to mount and arrange a ceramic or equivalent material pressure cylinder so that it will withstand the bursting pressure thereon during the injection molding operation. By mounting the pressure cylinder such that it is prestressed under normal conditions, the cylinder will be under a compressive circumferential stress which must be overcome before the circumferential stress passes from compression to tension.

Another object of the invention is to provide a superior arrangement of heating electrodes in the pressure cylinder.

It is to be understood that the invention may be used for other heating operations.

These and other objects, advantages, and features of the invention will become apparent from the following description and drawings which are merely exemplary.

In the drawings:

Fig. 2 is an enlarged view of the pressure heating cylinder of Fig. 1.

Fig. 3 is a sectional view taken along the line 3—3 of Fig. 2.

Fig. 4 is a modified form of pressure cylinder and electrodes.

Fig. 5 is a sectional view looking in the direction of 5—5 of Fig. 4.

Figure 1:
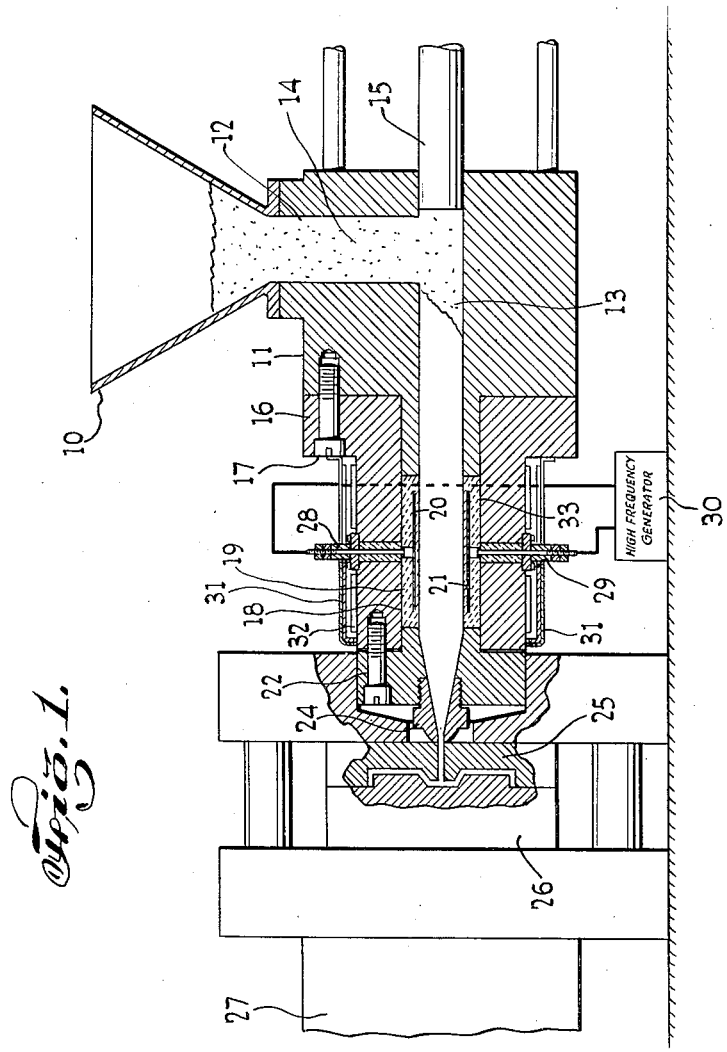
Fig. 1 is a fragmentary sectional view of an injection molding machine showing the use of a prestressed dielectric heating pressure cylinder.

Referring to Fig. 1, hopper 10 is fastened to frame 11 which has a feed passage 12 communicating with horizontal feed bore 13. The plastic material 14 to be heated is thus fed into a position in front of the reciprocable pressure plunger 15, a suitable valve or gate (not shown) being provided if desired. Annular heating or pressure cylinder holder 16 is fastened to main frame 11 by means of bolts 17. Constrained in the bore 18 of the pressure cylinder holder or support 16 is a pressure cylinder or heating chamber 19, said cylinder being made of a suitable insulating material and having electrodes 20 and 21 embedded therein. The cylinder 19 may be of ceramic material, or any other suitable insulating material, as desired, examples thereof being steatite, fused quartz, "Pyrex" glass, etc.

Injection nozzle holder 22 is bolted to pressure cylinder holder 16 by means of bolts 23, there being an injection nozzle 24 screw threadedly engaged in the end of nozzle holder 22. Injection nozzle 24 is arranged to cooperate with the dies 25 and 26, said dies being held in closed position by means of a hydraulic ram 27 or other suitable means. Reciprocation of plunger 15 will force plastic material in bore 13 through the heating cylinder 19 and thence into the dies 25 and 26. The cycle of operation is arranged such that the plastic material will be within the pressure cylinder 19 and the current applied so that the plastic is heated to the correct temperature for the particular molding operation.

Heating in the pressure cylinder 19 is accomplished by connecting electrodes 20 and 21 through leads 28 and 29 with the high frequency generator 30, high frequency generator 30 being of any suitable type for the purpose and preferably having a frequency of less than 150 megacycles per second. A shield 31 surrounding an asbestos covering and the heating cylinder assembly for the purpose of preventing escape of heat therefrom may be provided there being a resistance heating coil 32 around the cylinder holder 16 to provide an additional source of heat. The interior surface of shield 31 may have a reflecting surface thereon.

Ceramic and similar materials normally are relatively weak in circumferential tensile stress and inasmuch as considerable pressure is exerted in the molding operation, it is necessary that the cylinder 19 be of sufficient strength to withstand said pressure. In order to provide for this, pressure cylinder 19 is fitted within the bore 33 so as to be prestressed or to be under normal circumferential compressive stress. This may be accomplished in various well known manners such as, for example, heating cylinder holder or support 16 to expand the bore 18 therein so that a properly sized pressure cylinder 19 can be placed therein. Upon cooling of the support 16 thereafter, the pressure cylinder 19 will be placed under a circumferentially compression stressed or prestressed condition. When pressure is exerted by the plunger 15 on the plastic, the circumferential compressive stress may pass to tension, and the circumferential compressive stress exerted on the pressure cylinder must be overcome before the stress becomes tension.

Electrodes 20 and 21 are embedded in the pressure cylinder and preferably are not concentric with the bore 34 of the heating cylinder, this being done for the purpose of having uniform heating throughout the plastic material within the bore 34. It is obvious that there is a smaller cross sectional area within the bore to be heated between the outer edges of the electrodes and for this reason they are spaced further apart so as to reduce the undesirable higher heating of the plastic thereof in said portion.

In a second form of the invention as seen in Figs. 4 and 5, similar parts are given identical numerals for convenience. Electrodes 35 and 36 are arranged interiorly of the prestressed ceramic pressure cylinder 37 so as to be directly in contact with the plastic material. This will be satisfactory when metal of sufficient hardness for the plastic involved is chosen or the electrodes are faced with a hard metal. The faces of the electrodes may be flattened so that there is a rectangular-like bore 38 through which the plastic material is fed, guide 42 serving to guide the material to the heating chamber from the circular plunger bore. Electrodes 35 and 36 are connected to leads 28 and 29, respectively, which in turn can be connected to a suitable high frequency generator. The ceramic cylinder can surround the metal electrodes at the ends thereof and the pressure exerted by nozzle holder 22 against the cylinder and guide plug 42 arranged so that the ceramic cylinder has a compressive stress exerted thereon in a longitudinal direction as well as circumferential stress.

The plastic material is forced through cylinder 39 by means of the plunger and into heating cylinder 40 between the electrodes 35 and 36 in any desired type of cycle. The size of the electrodes and arrangement is made such as to properly heat the plastic therebetween in the time allowed by the stroke of the injection plunger or in accordance with the particular cycle chosen.

In the form shown in Figs. 4 and 5, the flattening of the electrodes will provide uniform heating and it is apparent that the ceramic may be shaped to provide a flat portion upon which a thin flat electrode may be placed.

In the event a frequency is chosen wherein the electrode length becomes an appreciable part of the wave length, it becomes desirable to replace the two electrodes with a hollow cylindrical or hollow square electrode known as a wave guide. Such an electrode may be covered or embedded in the ceramic or like material.

The type of injection molding machine specifically shown is for illustration only, and it is to be understood that changes may be made in the details of construction without departing from the spirit of the invention as defined in the appended claims.

I claim:

1. In an injection molding press or the like, a pressure cylinder heating chamber having walls composed of a ceramic or the like, an injection plunger for feeding material into and out of said chamber, a constraining means surrounding the walls of said chamber and holding said chamber wall in a circumferential compressive stressed condition when the plunger is at rest, said electrodes being covered by the ceramic material, an injection nozzle connected to said chamber, a source of high frequency current connected to said electrodes whereby plastic can be dielectrically heated in said chamber, and means moving said injection plunger relative to said chamber causing heated plastic to be forced through said nozzle into a mold, said plastic in the heating chamber being placed under high pressure during the injection movement of the plunger because of resistance to flow of said plastic through said nozzle.

2. In an injection molding press or the like, a pressure cylinder heating chamber having walls composed of a ceramic or the like and a bore therein, an injection plunger for feeding material into and out of the bore of said chamber, a constraining means surrounding and holding the walls of said chamber and normally creating a circumferential compressive stress in the walls of said chamber when the plunger is at rest, a pair of electrodes embedded in the walls of said chamber, said electrodes having a greater radius than the bore of said heating chamber, an injection nozzle connected to said chamber, a source of high frequency current connected to said electrodes whereby plastic can be dielectrically heated in said chamber, the shape of said electrodes heating the plastic uniformly throughout the cross-section thereof, and means moving said injection plunger relative to said chamber causing heated plastic to be forced through said nozzle, said heating chamber having a high pressure exerted thereon by the plastic in the chamber during injection.

3. In a molding machine of the character described, the combination comprising a pressure cylinder heating chamber having walls composed of a ceramic or the like, means for feeding material into and out of said chamber, a restricted area in the material passage from the chamber, a constraining pressure cylinder holder surrounding the walls of said chamber and normally prestressing said pressure cylinder walls so that there is a circumferential compressive stress in the walls thereof, electrodes carried by said pressure cylinder, a source of high frequency current connected to said electrodes whereby plastic can be dielectrically heated in said pressure cylinder, said means for feeding causing a high pressure to be exerted outwardly on the walls of said chamber as the heated plastic is moved out of the pressure cylinder by said feeding means.

4. In a molding machine of the character described, the combination comprising a pressure cylinder heating chamber having walls composed of an insulating material, means for feeding material into and out of said chamber, a restricted passage in the path of the material being fed out of said chamber, a constraining pressure cylinder holder surrounding said chamber and normally prestressing said pressure cylinder walls in compression so that there is a circumferential compressive stress in the walls thereof, electrodes carried by the walls of said pressure cylinder, a source of high frequency current connected to said electrodes whereby plastic can be dielectrically heated in said pressure cylinder, said means for moving said heated plastic through said restricted passage causing a high pressure to be exerted outwardly on the walls of said chamber as the heated plastic is moved out of the pressure cylinder by said feeding means.

5. In an injection molding press, a pressure cylinder heating chamber having walls composed of electric insulating material, an injection plunger for feeding material into and out of said chamber, a constraining means holding said chamber prestressing said pressure cylinder chamber walls so that a circumferential compressive stress is placed thereon when said plunger is at rest, plate-like electrodes carried by said chamber walls, an injection nozzle connected to said chamber, a source of high frequency current connected to said electrodes whereby plastic is dielectrically heated in said chamber, and injection plunger moving means operating said injection plunger relative to said chamber causing heated plastic to be forced through said nozzle, said plastic in the heating chamber being subjected to high pressure during injection because of resistance to flow of said plastic through said nozzle.

6. In an injection molding press having dielectric heating means for plastic material, the combination comprising a ceramic wall material receiving pressure cylinder, electrode means embedded in the wall of said cylinder for dielectrically heating plastic in said cylinder, constraining means surrounding said cylinder holding the same under a predetermined circumferential compressive stress, and injection means connected to said cylinder operable to force heated plastic material from said cylinder into a mold, said injection means exerting pressure on said plastic in the ceramic cylinder and causing said plastic to exert a force outwardly against said cylinder in a direction opposite to the force exerted by said constraining means.

JOSEPH V. BERTRAND.

REFERENCES CITED

The following references are of record in the file of this patent:

UNITED STATES PATENTS

| Number | Name | Date |
| --- | --- | --- |
| 1,199,430 | Salter | Sept. 26, 1916 |
| 2,048,316 | Beatty | July 21, 1936 |
| 2,151,157 | Schelkunoff | Mar. 21, 1939 |
| 2,197,122 | Bowen | Apr. 26, 1940 |
| 2,245,608 | Rogers | June 17, 1941 |
| 2,315,558 | Somes | Apr. 6, 1943 |
| 2,398,318 | MacMillin et al. | Apr. 9, 1946 |
| 2,415,025 | Grell et al. | Jan. 28, 1947 |
| 2,436,999 | MacMillin et al. | Mar. 2, 1948 |